March 19, 1940. E. F. CHAMBLESS ET AL 2,193,802
FASTENER
Filed June 16, 1937
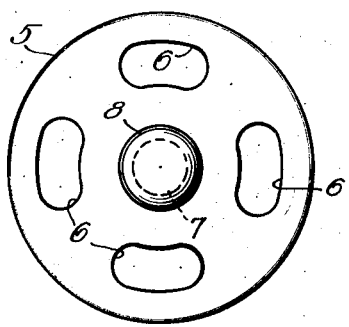
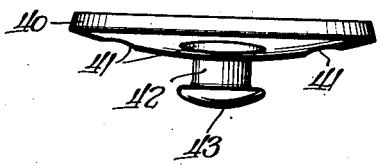
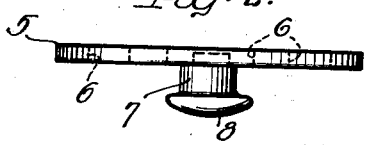
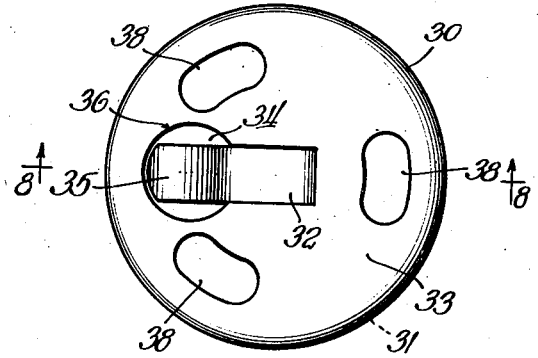
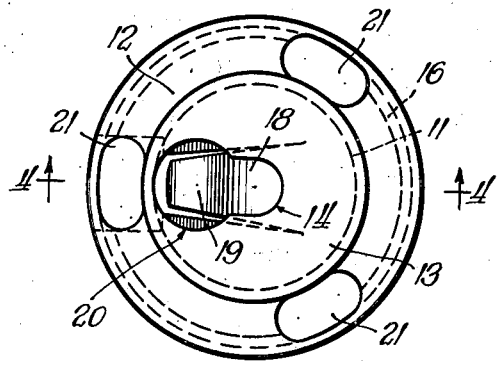
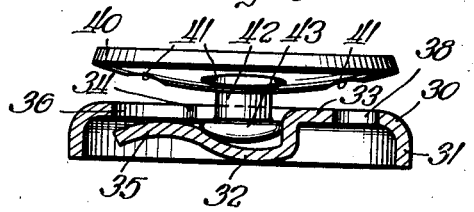
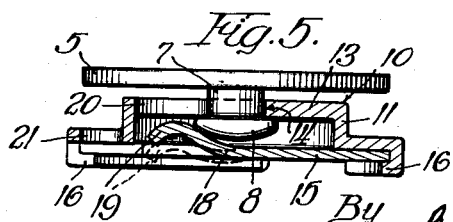
Inventors:
Ersyl F. Chambless,
Joseph W. Fay.
By Brown, Jackson, Boettcher & Dienner
Attys.

Patented Mar. 19, 1940

2,193,802

UNITED STATES PATENT OFFICE 2,193,802

FASTENER

Ersyl F. Chambless, Chicago, and Joseph W. Fay, Villa Park, Ill.

Application June 16, 1937, Serial No. 148,426

1 Claim. (Cl. 24—224)

This invention relates to fasteners and has particular reference to fasteners for garments and various parts of garments.

One of the main objects of the invention is to provide a fastener, the parts of which may be engaged and disengaged conveniently and, when engaged with each other, are effectively prevented from unintentional separation.

It is also an object of the invention to provide a fastener of simple and inexpensive construction, composed of few parts.

It is a further and more specific object of the invention to provide a fastener having a keyhole opening in one part, a headed stud on the other part insertable into the enlarged portion of the keyhole opening and movable laterally into the reduced portion of said opening to secure the fastener parts together, and a spring tongue integral with or constituting a unitary part of the fastener part having the keyhole opening. The spring tongue has a portion disposed beneath the enlarged part of the opening, which spring tongue portion is displaced by the entrance of the head of the stud, serves to kick or push the stud out of the enlarged part of the opening when the head of the stud is registered therewith, and further serves yieldingly to hold the stud in the reduced part of the opening and against unintentional lateral movement of the stud into register with the enlarged part of the opening, thereby effectively preventing unintentional separation of the fastener parts.

Further objects and advantages of the invention will appear from the following detailed description taken in connection with the accompanying drawing, in which:

Figure 1 is a plan view of the male member of our improved fastener;

Figure 2 is a side view of the member shown in Figure 1;

Figure 3 is a plan view of the female member of our improved fastener;

Figure 4 is a section taken on the line 4—4 of Figure 3;

Figure 5 is a section through the female member of the fastener similar to Figure 4, and showing the male fastener member engaged therewith;

Figure 6 is a plan view of another form of female fastener member embodying the present invention;

Figure 7 is a side view of the male fastener member for use with the female fastener member shown in Figure 6; and Figure 8 is a section similar to Figure 4 taken on the line 8—8 through the female fastener member shown in Figure 6, and showing the male fastener member shown in Figure 7 engaged therewith.

Referring to the embodiment of the invention shown in Figures 1 to 5, inclusive, of the drawing, the male fastener member comprises a metal disc 5 having openings 6, by means of which openings the disc 5 is stitched or otherwise secured to one of the parts of the garment. Fixed to the disc 5 and projecting centrally therefrom is a stud 7 provided at its outer end with a suitable head 8.

The female fastener member comprises a metal disc 10 having a central raised portion 11 of circular form surrounded by an integral annular flange 12. The outer wall 13 of the raised portion 11 has a keyhole shaped opening 14. The back of the raised portion 11 is covered by a disc 15 preferably formed of suitable spring metal. The outer periphery of the disc 15 is secured marginally to the outer periphery of the flange 12—for example, by turning the outer margin of the flange 12 over the marginal edge of the disc 15 and securing the same thereto as shown at 16.

Cut or struck out of the disc 15 and integral therewith is a spring tongue 18. This tongue 18 is resilient and terminates at its free end in a humped portion 19. The humped portion 19 is disposed beneath the enlarged part 20 of the keyhole opening 14, which enlarged part of the opening is disposed out laterally of the center of the fastener member 10. The reduced part of the opening 14 is disposed so that when the shank of the stud 7 is positioned therein as shown in Figure 5, the stud 7 will be coaxial with the fastener member 10, and the members 5 and 10 will be coaxially disposed. Openings 21 through the flange 12 and the adjacent portion of the disc 15 permit stitching or other suitable attachment of the fastener member 10—for example, to the part of the garment which it is desired to secure to the part to which the other fastener member is attached.

The normal position of the spring tongue 18 is shown in full lines in Figures 4 and 5. The fastener members are engaged with each other by inserting the head 8 of the stud 7 through the enlarged part 20 of the keyhole opening 14 and moving the stud 7 laterally into the reduced part of the opening 14 as shown in Figure 5, the head 8 serving to secure the fastener parts against separation in a direction axially of the stud 7 when the fastener members are so engaged.

As shown in dotted lines in Figure 5, the humped end 19 of the spring tongue 18 is depressed downwardly by the entrance of the head of the stud 7 into the enlarged part 20 of the opening, and when the stud is moved into the reduced part of the opening 14 the humped end 19 of the spring tongue springs back substantially to the position shown in full lines in Figure 5. In this position the humped end 19 of the spring tongue presents a yielding abutment in the path of movement of the stud from the reduced to the enlarged part of the opening 14, thereby yieldingly preventing unintentional separation of the fastener members from each other.

The humped end 19 of the spring tongue 18 acts from the dotted line position to the full line position (Figure 5) at substantially right angles to the lateral movement of the fastener member 5 in positioning the stud 7 in the enlarged part 20 of the keyhole opening. By reason of this action of the humped portion of the spring arm and its positioning beneath the enlarged part 20 of the opening 14 when the head 8 of the stud 7 is registered with the enlarged part of he opening 14, the humped portion or free end of the spring tongue 18 kicks or pushes the head 8 of the stud out of the enlarged part 20 of the opening to assure separation of the fastener parts and to facilitate such separation. This and the manner in which the spring tongue acts to prevent unintentional movement of the stud 7 into register with the enlarged part 20 of the opening 14 are important aspects of the present invention.

In the embodiment of the invention shown in Figures 6, 7 and 8, the female fastener member comprises a metal disc 30 having a depending marginal flange 31. The spring tongue 32 corresponds with the spring tongue 18 of the preceding embodiment of the invention, except that in the present embodiment this tongue 32 is cut or struck directly out of the disc 30 which is secured to one of the parts of the garment as, for example, by means of the openings 38. The metal removed by cutting and pressing the spring tongue 32 from the wall 33 of the disc 30 at least partially forms the keyhole shaped opening 34.

The opening 34 corresponds with the opening 14 of the preceding embodiment of the invention, and the spring tongue 32 terminates at its outer end in a humped portion 35 like the humped portion 19 shown in Figures 4 and 5, and similarly disposed beneath the enlarged part 36 of the opening 34.

The male fastener member of the embodiment of the invention shown in Figures 6, 7 and 8 comprises a metal disc 40 having openings 41, by means of which openings the disc 40 is stitched or otherwise secured to one of the parts of the garment. The disc 40 is shown of slightly concave form in Figure 7, but it may be like the disc shown in Figure 1, or of any other suitable or preferred construction. The stud 42 is fixed to the disc 40, projects centrally therefrom, and is provided at its outer end with a suitable head 43.

The fastener members shown in Figures 6, 7 and 8 are engaged and disengaged in the manner shown and described in connection with the preceding embodiment, and have all the advantages of that embodiment, and the additional advantage of accomplishing all of the desired ends with only two fastener parts, i. e., the parts 30 and 40, and without separate spring discs and the like. This further reduces the cost without sacrificing any of the advantages already set forth.

We do not intend to be limited to the precise details shown and described.

We claim:

A fastener of the class described comprising a fastener member having an annular flange and a raised portion encircled by said flange, said flange having means for securing said fastener member to part of a garment, the outer wall of said raised portion having a keyhole opening therein, a second fastener member having a headed stud insertable by axial movement into the enlarged part of the keyhole opening and movable laterally into the reduced part of said opening to secure the fastener members together, a spring metal disc covering the back of said first fastener member and secured marginally to the flange thereof, and a spring tongue struck from said disc, one end of said tongue being formed integrally with the disc adjacent the end of the restricted portion of the keyhole opening which is most remote from the enlarged portion thereof, said tongue thereby underlying the keyhole opening for its full length and at its free end having a humped portion disposed beneath the enlarged portion of the keyhole opening, the humped portion of the spring tongue being displaced by the entrance of the head of the stud into the larger part of the keyhole opening, and said stud thereafter sliding inwardly along said tongue into the restricted portion of the opening where it is clamped between the tongue and the marginal edges of the restricted portion of the keyhole opening, the humped portion of the spring tongue during such latter movement of the stud returning to its normal position and presenting a yielding abutment in the path of movement of the stud from the reduced to the enlarged part of said opening yieldingly to retain the fastener members against unintentional separation.

ERSYL F. CHAMBLESS.
JOSEPH W. FAY.